(12) United States Patent
Boot et al.

(10) Patent No.: US 9,139,023 B2
(45) Date of Patent: Sep. 22, 2015

(54) LABEL PRINTING APPARATUS

(75) Inventors: Bram Boot, Borgerhout (BE); Stephen Gohde, Atlanta, GA (US); Stephen Spencer, Atlanta, GA (US); Stefaan Van Den Broecke, Ghent (BE)

(73) Assignee: SANFORD L.P., Downers Grove, IL (US)

( * ) Notice: Subject to any disclaimer, the term of this patent is extended or adjusted under 35 U.S.C. 154(b) by 352 days.

(21) Appl. No.: 13/529,943

(22) Filed: Jun. 21, 2012

(65) Prior Publication Data

US 2013/0342623 A1    Dec. 26, 2013

(51) Int. Cl.
| G06K 15/00 | (2006.01) |
| B41J 11/00 | (2006.01) |
| B41J 3/407 | (2006.01) |
| B41J 3/46 | (2006.01) |
| G06F 3/12 | (2006.01) |

(52) U.S. Cl.
CPC .............. B41J 11/008 (2013.01); B41J 3/4075 (2013.01); B41J 3/46 (2013.01)

(58) Field of Classification Search
CPC ................ G06F 3/1243; G06K 15/024; G06T 2219/004
See application file for complete search history.

(56) References Cited

U.S. PATENT DOCUMENTS

| 5,933,589 A | 8/1999 | Hidaka et al. |
| 2008/0079956 A1 | 4/2008 | Chelvayohan et al. |
| 2009/0190987 A1 | 7/2009 | Vleurinck et al. |
| 2010/0328714 A1* | 12/2010 | Allen et al. ................... 358/1.15 |
| 2011/0074710 A1 | 3/2011 | Weeldreyer et al. |
| 2013/0342856 A1* | 12/2013 | Boot et al. ...................... 358/1.6 |
| 2014/0198323 A1 | 7/2014 | Jacobs et al. |
| 2014/0226169 A1 | 8/2014 | Jacobs et al. |

FOREIGN PATENT DOCUMENTS

| EP | 0 267 890 A2 | 5/1988 |
| EP | 322918 A2 | 7/1989 |
| EP | 322918 B1 | 7/1989 |
| EP | 322919 A2 | 7/1989 |
| EP | 322919 B1 | 7/1989 |
| EP | 578372 A2 | 1/1994 |
| EP | 578372 B1 | 1/1994 |
| WO | WO-2013119904 A1 | 8/2013 |

OTHER PUBLICATIONS

Extended European Search Report for EP 13171372.9, dated Sep. 3, 2013.

* cited by examiner

*Primary Examiner* — Dov Popovici
(74) *Attorney, Agent, or Firm* — Marshall, Gerstein & Borun LLP

(57) ABSTRACT

A method of creating a label to be printed on a label printing apparatus includes determining at least one option to be made available to a user relating to a label-creating process, displaying the at least one option on a display, and enabling a user to select the at least one option. The determination of the at least one option to be made available to the user is based upon at least one parameter.

17 Claims, 9 Drawing Sheets

LABEL PRINTING APPARATUS

The present invention relates to a label printer for printing an image onto a label. In particular but not exclusively, some embodiments relate to a user interface of such a label printer.

Known label printing apparatuses are disclosed in EP-A-322918 and EP-A-322919 (Brother Kogyo Kabushiki Kaisha) and EP-A-267890 (Varitronic). The label printing apparatuses each include a cassette receiving bay for receiving a cassette or tape holding case. In EP-A-267890, the tape holding case houses an ink ribbon and a substrate tape, the latter comprising an upper image receiving layer secured to a backing layer by an adhesive. In EP-A-322918 and EP-A-322919, the tape holding case houses an ink ribbon, a transparent image receiving tape and a double sided adhesive tape which is secured at one of its adhesive coated sides to the image tape after printing and which has a backing layer peelable from its other adhesive coated side. With both these apparatus, the image transfer medium (ink ribbon) and the image receiving tape (substrate) are in the same cassette.

It has also been proposed by the present applicants in, for example, EP-A-578372 to house the ink ribbon and the substrate tape in separate cassettes.

In all of these cases, the image receiving tape passes in overlap with the ink ribbon to a print zone consisting of a fixed print head and a platen against which the print head can be pressed to cause an image to transfer from the ink ribbon to the image receiving tape. There are many ways of doing this, including dry lettering or dry film impression, but the most usual way currently is by thermal printing where the print head is heated and the heat causes ink from the ink ribbon to be transferred to the image receiving tape.

In other known tape printing apparatuses, so-called direct thermal tapes are used, in which an image is created directly onto the direct thermal tape without the interposition of an ink ribbon cassette. Elements of a print head are heated, and the heat causes chemicals within the direct thermal tape to react and produce an image in or on the tape.

The apparatuses of the type described above are provided with a keyboard which enables a user to enter characters, symbols and the like to form an image to be printed by the tape printer. The keyboard usually has text character keys and number keys for entering letters and numbers respectively, plus some function keys which, among other things, operate menus and allow printing attributes to be set.

"Stand-alone" label printers can be distinguished from "label printer systems", which comprise a printer connected to a PC or other computing device. In such label printer systems, a user creates or edits a label for printing using a PC, and then sends print data to a printer to cause the printer to print the print data onto a label medium. In such label printer systems, the user will view a display of the PC to create a label, rather than a display of the printer. Also, the label-editing software used for creating the label will be stored and run on the PC, rather than the printer.

In contrast, stand-alone label printers are operable independently of a PC or other computer to create and print a label. Although some stand-alone printers are connectable to a PC or other computer to receive some data, they are nevertheless operable independently of the PC or other computer to create a label for printing, since label-editing software used for creating the label is stored and run on the label printer itself. Stand-alone label printers thus usually include an integral display via which the user can view an interface of the label-editing software.

According to one aspect there is provided a method of creating a label to be printed by a label printing apparatus comprising: providing a user, on a display, with at least one option relating to a type of object to which the label to be printed is to be applied; and following selection of said at least one option displaying on said display an image of the label to be printed and an image of the object to which the label to be printed is to be applied.

The method may comprise displaying said image of the label adjacent to said image of the object to which the label is to be applied.

The method may comprise displaying said image of the label in a manner representative of how the label will appear when applied to the object.

The type of object may be selectable from a memory.

The type of object may comprise one of: a cable; a wire; a patch-panel; a terminal-block; a fuse-box; a 110-block; a module; a breaker block; a distribution panel.

The type of object may be captured as a photograph.

The parameters of said object may be adjustable.

The parameters of said label to be printed may be adjustable.

The adjustments to said parameters of said object may cause an update of the image of said object and/or the image of the label.

The adjustments to said label to be printed may cause an update of the image of the label and/or the image of the object.

The updates of said images may be displayed in real-time.

The label printing apparatus may be a stand-alone label printing apparatus.

The label-printing apparatus may be connectable to an external apparatus.

In another aspect there is provided a method of creating a label to be printed on a label printing apparatus comprising: determining at least one option relating to a label-creating process to be made available to a user, said determining at least one option dependent upon a type of image receiving medium in said label printing apparatus; displaying said at least one option on a display; and enabling a user to select said at least one option; and following selection of said at least one option determining at least one further option relating to the label-creating process to be made available to the user; and modifying said display to display said at least one further option.

In another aspect there is provided an apparatus comprising: means for providing a user, on a display, with at least one option relating to a type of object to which the label to be printed is to be applied; and means for displaying on said display, following selection of said at least one option, an image of the label to be printed and an image of the object to which the label to be printed is to be applied.

In another aspect there is provided an apparatus comprising: at least one processor; and at least one memory; the at least one processor and the at least one memory arranged to cause the apparatus at least to provide a user, on a display, with at least one option relating to a type of object to which the label to be printed is to be applied; and arranged to display, following selection of said at least one option, an image of the label to be printed and an image of the object to which the label to be printed is to be applied on said display.

In another aspect there is provided an apparatus comprising: means for determining at least one option relating to a label-creating process to be made available to a user, said determining at least one option dependent upon a type of image receiving medium in said label printing apparatus; means for displaying said at least one option on a display; means for enabling a user to select said at least one option; wherein said apparatus is arranged to, following selection of said at least one option, determine at least one further option relating to the label-creating process to be made available to the user; and is arranged to modify said display to display said at least one further option.

In another aspect there is provided an apparatus comprising: at least one processor; and at least one memory; the at least one processor and the at least one memory arranged to cause the apparatus at least to determine at least one option relating to a label-creating process to be made available to a user, dependent upon a type of image receiving medium in said label printing apparatus; and display said at least one option on a display; and enable a user to select said at least one option; and following selection of said at least one option said apparatus is arranged to determine at least one further option relating to the label-creating process to be made available to the user; and modify said display to display said at least one further option.

In another aspect there is provided a computer program comprising computer program code means adapted to perform the above defined method when said program is run on a computer.

For a better understanding, and to show how embodiments may be carried into effect, reference will now be made by way of example only, to the accompanying figures in which.

Figure 3:
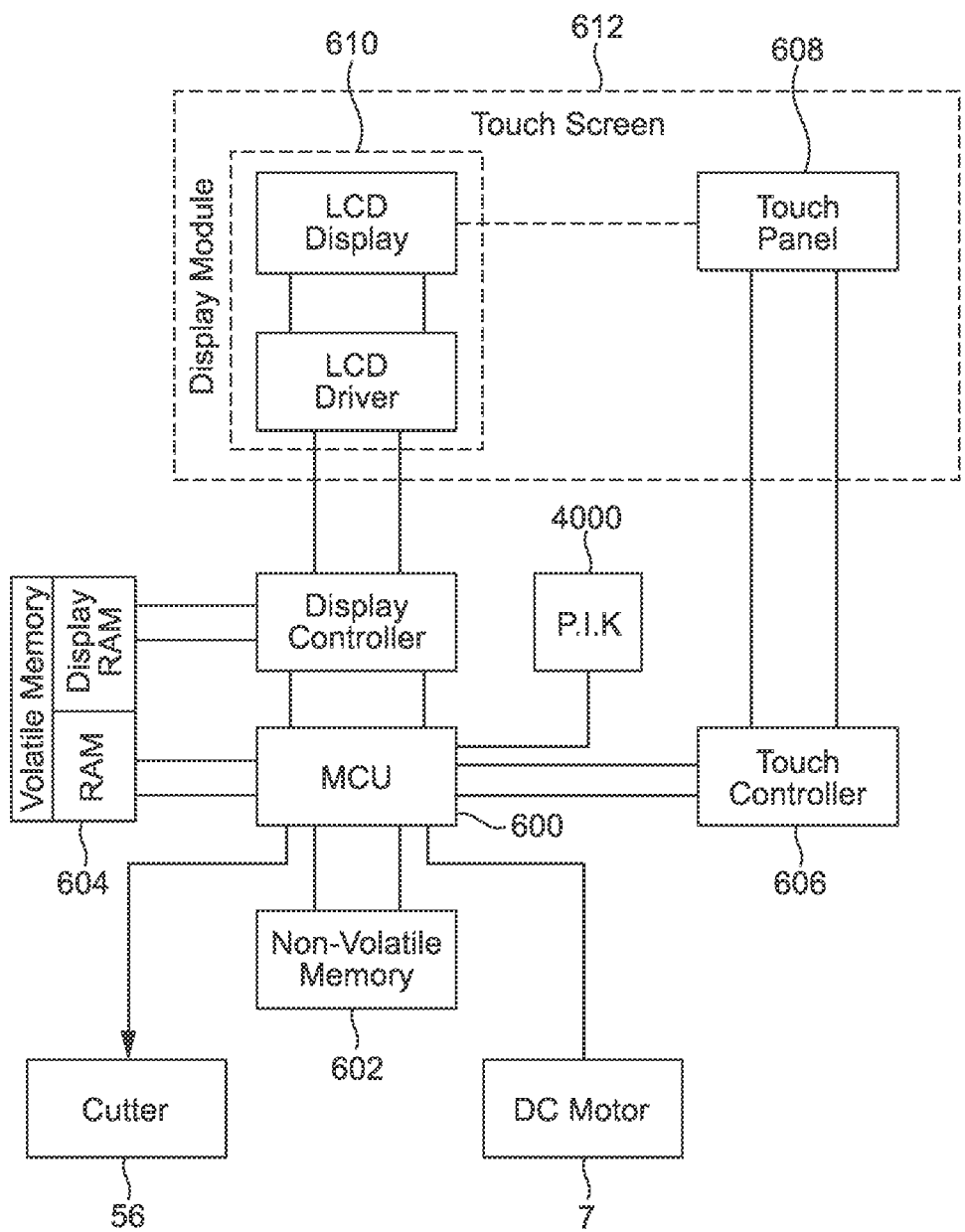

FIG. 3 schematically shows circuitry of an embodiment of a label printing apparatus.

Figure 4:
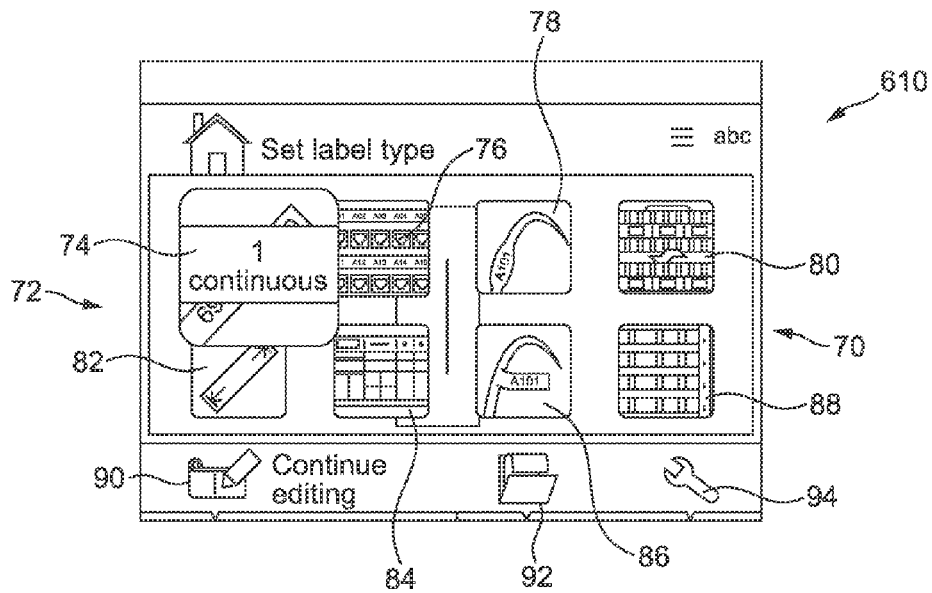

FIG. 4 shows an embodiment of a label printer user interface.

Figure 5:
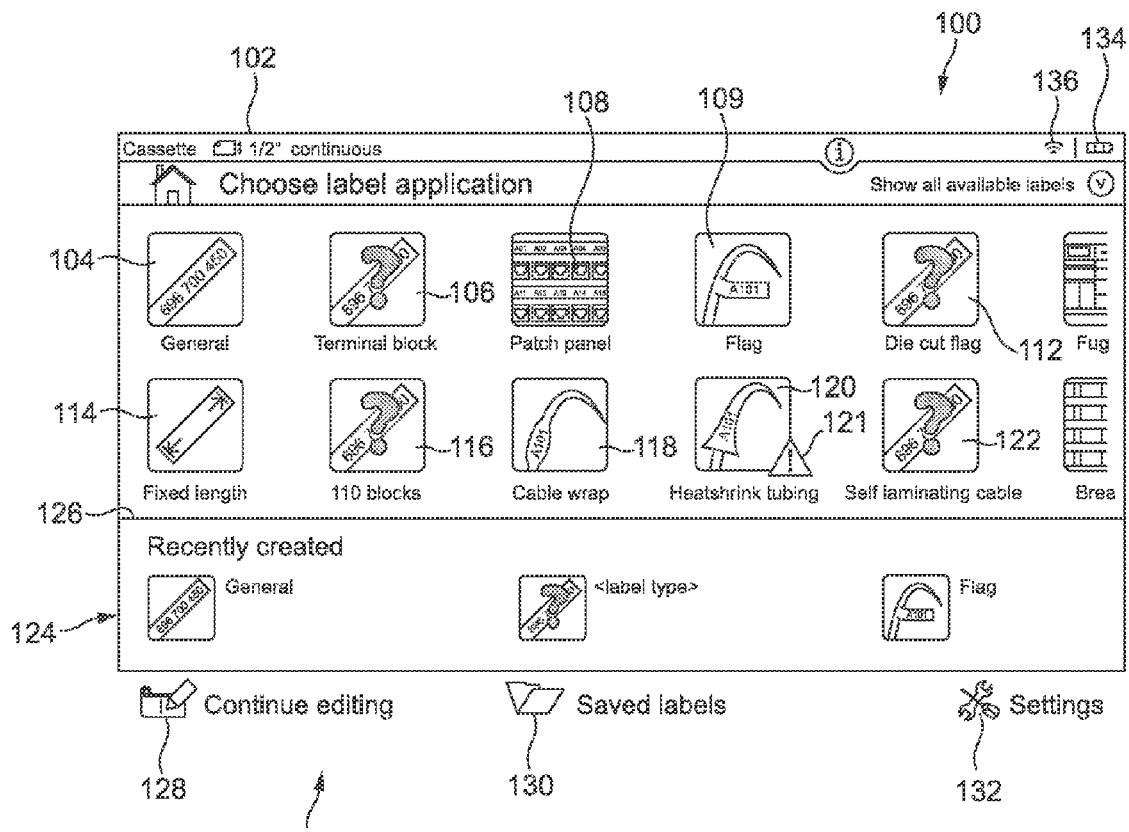

FIG. 5 shows another embodiment of a label printer user interface.

Figure 14:
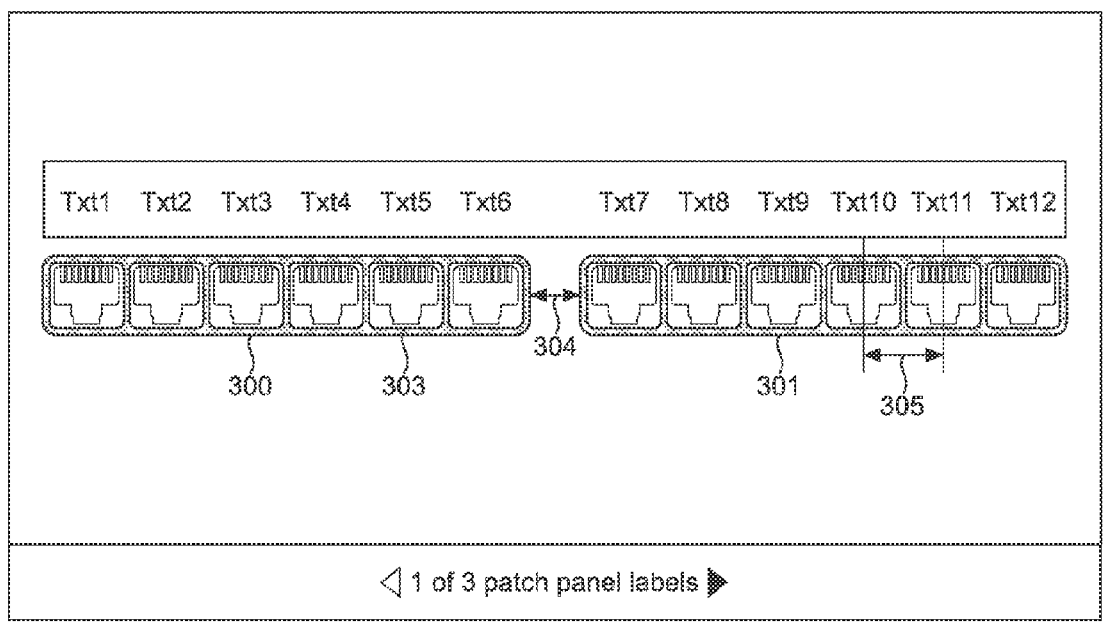

FIGS. 6 to 13 each show a preview of a label to be created in relation to various respective objects, according to an embodiment;

FIG. 14 shows a visualization of a patch panel and associated label where the patch panel has two groups.

Figure 1:
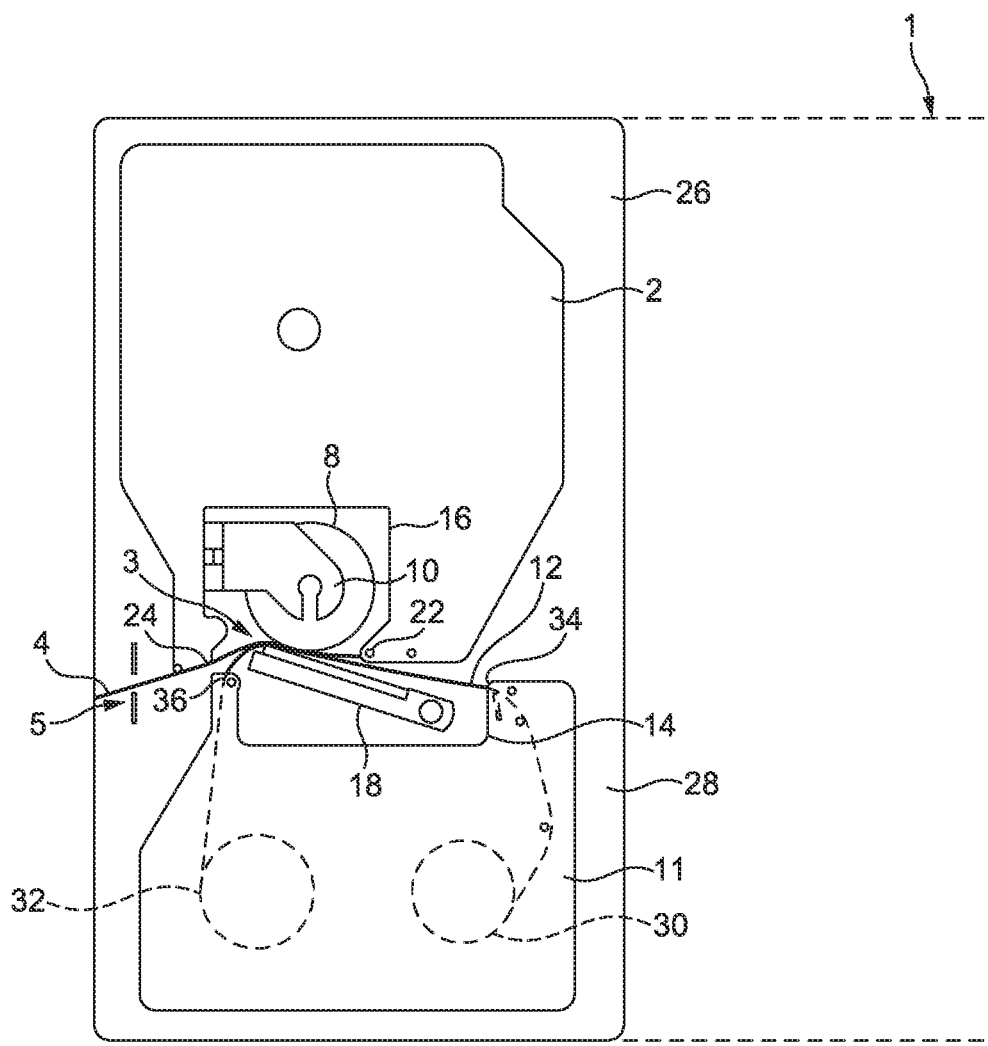
FIG. 1 shows certain features of one embodiment of a tape printing apparatus.

FIG. 1 shows in plan view a first label printer which has two cassettes arranged therein. Typically, this label printer is powered by batteries at least part of the time. Alternatively the label printer may be mains powered.

The upper cassette is located in a first cassette receiving portion 26 and contains a supply of image receiving tape 4 which passes through a print zone 3 of the label printer 1 to an outlet 5 of the label printer 1. The image receiving tape 4 comprises an upper layer for receiving a printed image on its upper surface and has its other surface coated with an adhesive layer to which is secured a releasable backing layer. The upper cassette 2 has a recess for accommodating a platen 8 of the label printer 1, and guide portions 22 and 24 for guiding the tape through a print zone 3. The platen 8 is mounted for rotation within a cage moulding 10. Alternatively the platen could be mounted for rotation on a pin.

The lower cassette 11 is located in the second cassette receiving portion 28 and contains a thermal transfer ribbon 12 which extends from the supply spool 30 to a take-up spool 32 within the cassette 11. The thermal transfer ribbon 12 extends through the print zone 3 in overlap with the image receiving tape 4. The cassette 11 has a recess 14 for receiving a print head 18 of the label printer 1 and guide portions 34 and 36 for guiding the thermal transfer ribbon 12 through the print zone 3. Print head 18 is moveable between an operative position shown in FIG. 1, in which it is in contact with the platen 8 and holds the thermal transfer ribbon 12 and the image receiving tape 4 in overlap between a print head 18 and the platen 8 in an inoperative position in which it is moved away from the platen 8 to release thermal transfer ribbon 12 and image receiving tape 4. In the operative position, the platen 8 is rotated to cause the image receiving tape 12 to be driven past print head 18 and the print head 18 is controlled to print an image on the image receiving tape 4 by thermal transfer of ink from the ribbon 12. Each of the printing elements on the print head 18 is activatable separately and is activated in accordance with the desired image to be printed. The label printer 1 has a lid (which is not shown) which is hinged along the rear of the cassette receiving portions 26 and 28 and which covers both cassettes when in place.

A DC motor 7 (see FIG. 3) continuously drives the platen 8. The platen is arranged to drive the image receiving tape 4 through the print zone 3 by the actuation of its own rotation. In other embodiments, transport of the image receiving tape across the print head can be done by other means, such as by a separate driven roller of the printer or of the cassette, or by a pair of cooperating rollers positioned on opposite sides of the tape, or by other means.

The image is printed by the print head 18 on the image receiving tape on a column by column basis with the columns being adjacent one another in the direction of movement of the tape 4.

Figure 2:
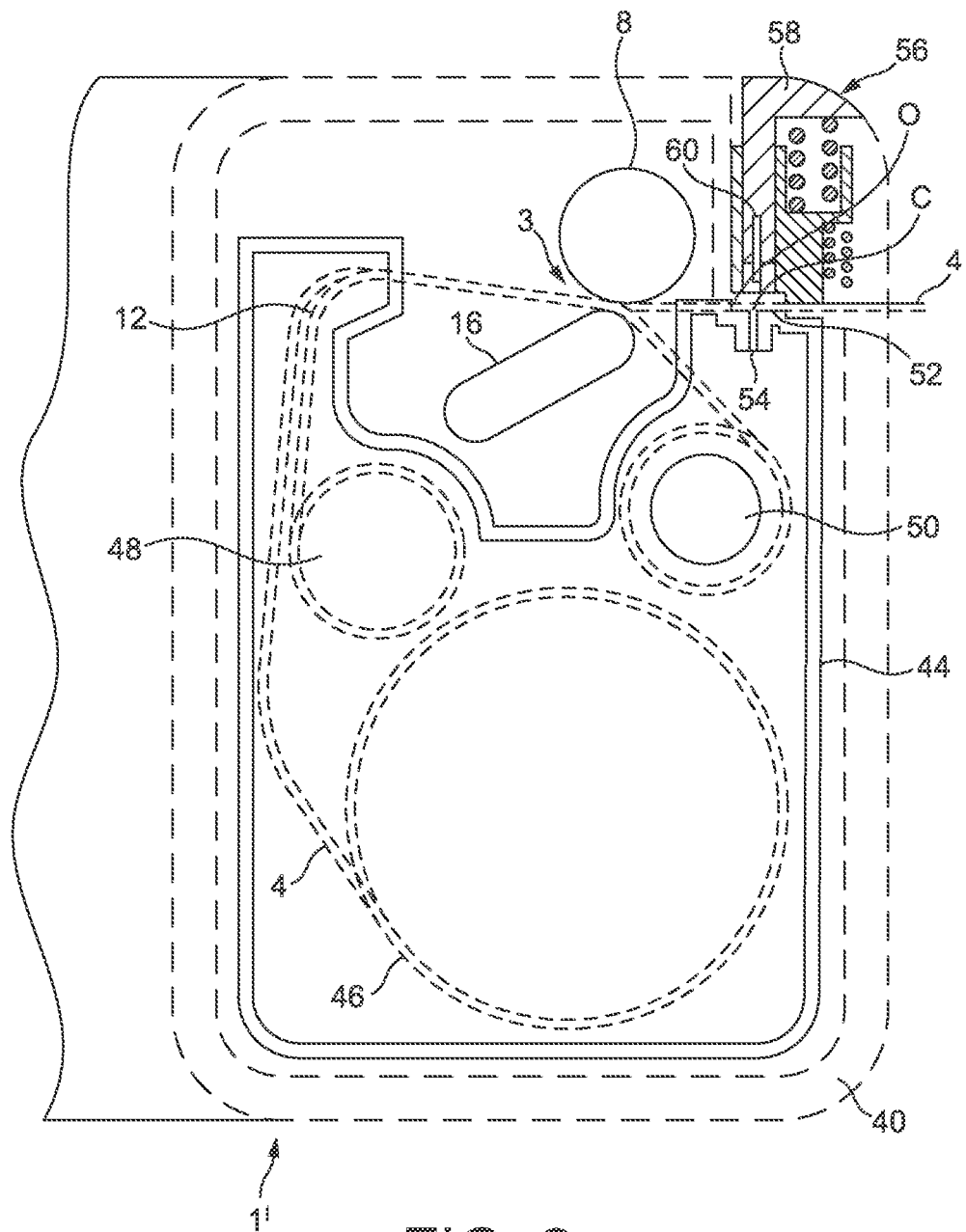
FIG. 2 shows certain features of another embodiment of a tape printing apparatus.

FIG. 2 illustrates in plan view a cassette bay of a second label printer 1' which uses a one cassette system. Like reference numerals are used for those parts which are also shown in FIG. 1. The cassette bay is shown by the dotted line 40. The cassette bay 40 includes a thermal print head 18 and a platen 8 which cooperate to define a print zone 3.

The print head 18 is pivotable about a pivot point so that it can be brought into contact with the platen 8 for printing and moved away from the platen 8 to enable the cassette to be removed and replaced as in the first embodiment. Alternatively the platen is pivotable so that it can be brought into contact with the printhead for printing and moved away from the printhead to enable the cassette to be inserted. A cassette inserted into the cassette bay 40 is denoted generally by reference numeral 44. The cassette 44 holds a supply spool 46 of image receiving tape 4. The image receiving tape 4 is guided by a guide mechanism (which is not shown) through the cassette 44, past the print zone 3 and out of the cassette 44 through an outlet O to a cutting location C. The same cassette 44 also has an ink ribbon supply spool 48 and an ink ribbon take up spool 50. The ink ribbon 12 is guided from the ink ribbon supply spool 48 through the print zone 3 and taken up on the ink ribbon take up spool 50. As with the first embodiment, the image receiving tape 4 passes in overlap with the ink ribbon 12 through the print zone 3 with its image receiving layer in contact with the ink ribbon 12. The platen of this second embodiment is also driven by a motor 7. The motor rotates to drive continuously the image receiving tape through the print zone 3 during printing. In either of the embodiments, it is possible that the tape be driven in a step wise manner by a stepper motor.

An image is printed on the tape fed out from the print zone to the cutting location C which is provided at a location in a portion of the wall of the cassette 44 which is close to the print zone 3. The portion of the wall on the cassette 44 where the cutting location C is defined is denoted by reference 52. A slot 54 is defined in the wall portion 52 and the image receiving tape 4 is fed past the print zone 3 and out of the cassette 44 through an outlet O to the cutting location C where it is supported by facing wall portions on either side of the slot 54.

The second label printing device 1' includes a cutting mechanism 56 including a cutter support member 58 which carries a blade 60. The blade 60 cuts the image receiving tape 4 and then enters the slot 54. It should be appreciated that the first embodiment will usually also include a cutting mechanism.

These example label printers 1 and 1' may act as stand-alone printing devices including a controller for receiving inputs from a user and to alter what is displayed on a display of the printing devices. Furthermore, the label printers 1 and 1' may also be connectable or connected to a PC, in which case the PC also includes a controller to receive inputs from a user and to alter what is displayed on a display of the printer or of the PC.

Basic circuitry for controlling the label printer 1 of FIG. 1 or the label printer 1' of FIG. 2 is shown in FIG. 3. There is a controller or "control means" (such as a micro controller unit (MCU) or processor) 600, a non-volatile memory 602 which is for example a read only memory (ROM) or a flash type of memory. The flash type of memory may be used in place of, or in addition to the read only memory. A volatile memory comprising a random access memory RAM 604 and/or display RAM is also provided. The MCU 600 is connected to receive label data input to it from a data input device such as a touch panel 608 of a touchscreen 612 via a touch panel controller 606. In alternative embodiments, the data input device may comprises one or more of a hardware keyboard including plural keys, a mouse, a digital pen or tracker ball, or any other means for enabling a user to send commands to the controller 600. In some embodiments, the touchscreen 612 is omitted. The MCU 600 outputs data to drive the display 610 (which together with the touch panel 608 form the touchscreen 612) to display a label to be printed (or a part thereof) and/or a message for the user. Additionally, the MCU 600 also outputs data to drive the print head 18 so that the label data is printed onto the image receiving tape to form a label. Finally, the MCU 600 also controls the motor 7 for driving the platen. The MCU 600 may also control the cutting mechanism 56 of FIG. 2 or a cutting mechanism of the device shown in FIG. 1 to allow a length of tape to be cut off. In alternative embodiments at least part of the cutting mechanism may be manually operated.

It should also be understood that where the label printer 1 or 1' is connected to an external apparatus such as a PC, then the PC also contains similar components such as at least one memory and at least one processor to enable the PC to carry out the operations of creating a label to be printed. Such a PC will also be connected to a display means such as a monitor.

Hereafter it should be understood that labels may be created on either or both of the label printing apparatus itself or on an external apparatus such as a PC connected to the label printer. Accordingly, it shall be understood that hereafter terms such as "memory", "processor" and "display" may refer to these components on either or both of a label printing apparatus and a PC.

A user interface according to an exemplary embodiment will now be described. FIG. 4 shows a user interface 70 displayed on display 610. In FIG. 4 a user is presented with a graphical control panel 72 which enables the user to select a label type. In this example the user has selected a 1 inch continuous label type 74, and accordingly this icon has been enlarged to demonstrate to the user that this option is selected.

Other options available to the user via this graphical control panel 72 include patch panel label type 76, cable wrap label type 78, 110-block label type 80, fixed length label type 82, module label type 84, flag label type 86, and breaker label type 88.

At the bottom of the display the user can also select a further option to continue editing 90, to open a folder 92 (from where saved labels can be selected for example), and a settings menu 94 from where printer settings can be adjusted.

FIG. 5 shows an exemplary graphical user interface 100 in a further embodiment. In this embodiment it has been detected that a user has inserted a tape cassette containing continuous tape of 0.5" width, as displayed in region 102 of display 610. The graphical user interface 100 displays all types of labels that are available to the user for a cassette of this width. The options available to a user via menu 100 include a general label type 104, a terminal block label type 106, a patch panel label type 108, a flag label type 109, a die-cut flag label type 112, a fixed length label type 114, a 110-block label type 116, a cable wrap label type 118, a heat shrink tubing label type 120, and a self-laminating cable label type 122.

More or less than these types of label may be provided. Additionally or alternatively different types of label may be available.

Additional or alternative types of label comprise one or more of a fuse box label type, a quick label type, a breaker box label type, a distribution panel label type, and a module type.

In FIG. 5 the heat shrink tubing label type is shown with an exclamation mark 121. This exclamation mark 121 indicates to the user that such a label cannot be properly printed with the presently inserted cassette.

The user is thus automatically presented with the label types that are available for the particular type of cassette that has been inserted into the printer. This reduces the number of key strokes required for a user to select a suitable label, and also prevents a user from attempting to create a label type that is unsuitable for the type of cassette inserted.

The graphical user interface 100 also includes a region 124 from which a user can select recently created labels. This portion of the menu is separated from the rest of the menu area by a divider line 126.

In another embodiment (not shown) this region 124 may be omitted.

Via this graphical user interface 100 the user can also select to continue editing by selecting icon 128, to open a saved labels folder using icon 130, or to enter a settings menu using icon 132.

The display also shows a battery power level 134, and also the strength of wireless connection 136 for embodiments where the printer is connected to a wireless network.

The menu and user interface structure described above leads the user through the label-creating process.

In some embodiments, once the user is at the label editing stage the display 610 shows a preview of the label in relation to a selected object type. This is shown for example in FIGS. 6 to 13.

Figure 6:
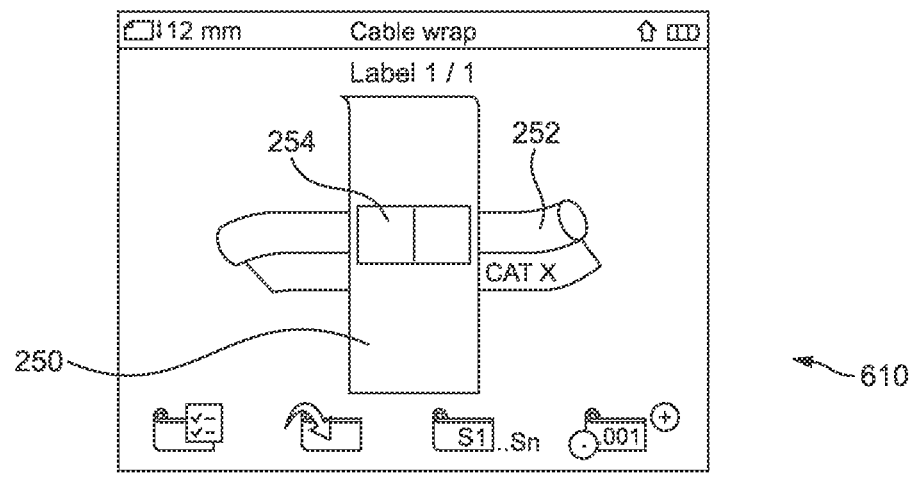

In FIG. 6 the user is editing a label 250. The user has already selected "cable wrap" as the label type. The user is now presented on the display 610 with a preview of the label 250 and a preview of the cable 252. To get to this stage the user may have already inputted data related to the label and object, such as the label width and the dimensions of the object. For example the label properties may have been automatically detected by the label printing apparatus upon insertion of a label cassette. The object properties may also have been captured in another way, such as uploading a photograph of the object to the label printing apparatus or external apparatus to which the label printing apparatus is connected. A cursor 254 shows where the text will be displayed once it has been entered by the user. This provides the user with a very accurate representation of how the label 250 will look in relation to the object 252.

Figure 7:
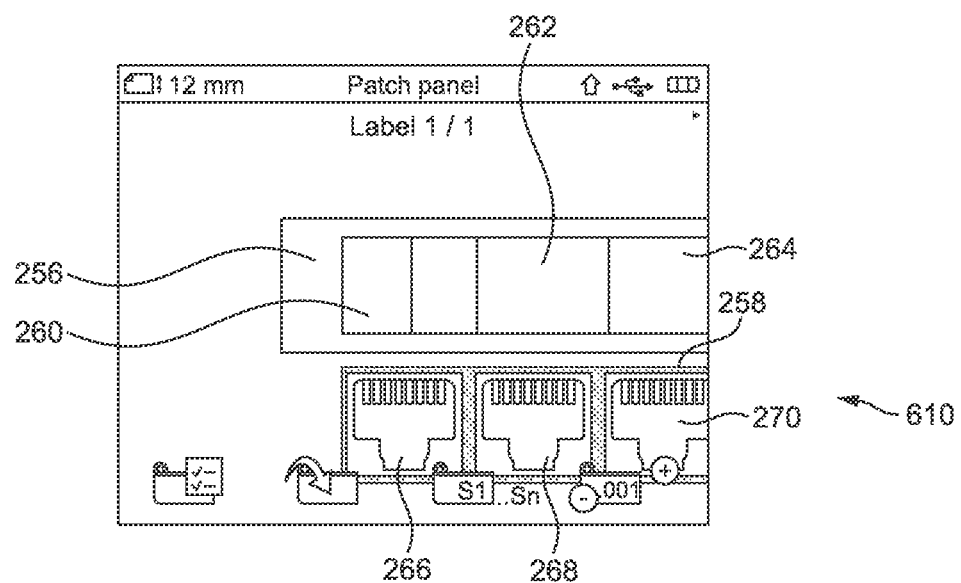

FIG. 7 shows the same principle but in relation to a patch panel label. The label 256 is shown next to a representation of a patch panel 258. In this example the user is clearly shown how the sections 260, 262 and 264 of the label line up relative to respective ports 266, 268 and 270 of the patch panel 258. Again, the user is provided with an accurate representation of how the label 256 will look when applied to the object, in this case patch panel 258.

The representation of the patch panel consists of single ports with a fixed width and height.

The representation may be changed by one or more of:

Changing the number of ports. This may be done by changing the number of ports in a property menu. The icons may be added to or removed from the right side to depict the set number of ports. In some embodiments, the icon may be added to or removed from the left side or in the middle. The position at which the icons are added or removed may depend on a cursor position.

Changing the centre to centre distance of the ports. This may be done by changing the centre to centre ports in a property menu. The distance between the icons of the ports will depend on the set center to center distance. This may cause the position of each icon to change with respect to for example the icon to the left or right.

Changing the number of groups. This may be done by changing the number of groups in a menu. The number of groups can be one or more.

Changing the port grouping. This may be done by changing the number of ports in a group in a property menu. The ports may be grouped together in dependence on the number of ports in two or more groups.

Changing the group clearance. This may be done by changing the clearance in a property menu. The distance between two groups of ports is based on the group clearance.

In some embodiments, the properties of the patch panel may be shown as different options in a list or menu. The user can change or select the value associated with one or more of the options. Alternatively or additionally one or more of the listed options may take the user to another screen in which the user is able to input one or more values for one or more properties of the patch panel and/or the label.

In this regard, reference is made to FIG. 14 which shows an example where the number of groups is two. The first group is referenced 300 and the second group is referenced 301. The distance between the two groups (group clearance) is referenced 304. The number of ports in each group is six. In some embodiments all the groups have the same number of ports. In other embodiments, one or more groups may have a different number of ports to one or more other groups. The port center to port center distance is referenced 305.

In some embodiments, each group of ports has an individual background visually representing the patch panel groups. The background may avoid blank areas (white or unshaded areas) between ports in a group. White or unshaded areas may be provided between groups. In some embodiments, a background is provided behind all ports in a group with a different or no background provided between groups. In some embodiments, no background is provided for all ports in a group and a background between groups.

The background for the ports may have a border which extends above and below the group of ports as well as to the right and left. The background may provide a border around each group.

In some embodiments a border may be provided in addition to or as an alternative to the background.

The label visualization of the patch panel label will have label placeholders with a dynamic width and length. Object boxes (e.g. sections 260) will be provided in dependence on the number of ports. Each port will have an associated object box. The size and position of the object boxes will depend on the properties of the patch panel (number of ports, number of groups of ports, number of ports in each group, group clearance, center to center distance between two ports). As one or more of these properties are changed, the appearance of the label and/or object boxes will change. The length of the label may change. The number of object boxes, the size of the object boxes, and/or the position of the object boxes may change.

In some embodiment, the user may select if two or more groups will have a single label or if one or more groups will share a label. The appearance of the label and respective object boxes will reflect this.

The label width may be selected by a user or may be selected in dependence on the width present in the label cassette.

In some embodiments, the user can select to show or hide a label outline. The user can additionally or alternatively select how the label outline is represented and/or at what location.

The user can additionally or alternatively select if label separator lines are to be shown and if so how.

FIGS. 8 to 13 show this principle in relation to different objects.

Figure 8:
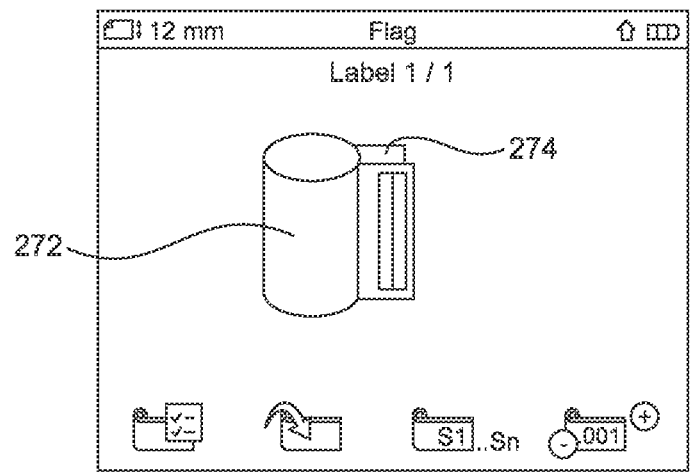

FIG. 8 shows a flag label 272 including a flag portion 274. As the user enters text the flag portion 274 will extend so as to accommodate the entered text. Alternatively the flag label 272 may be displayed in relation to a cable which the flag label could be applied to.

Figure 9:
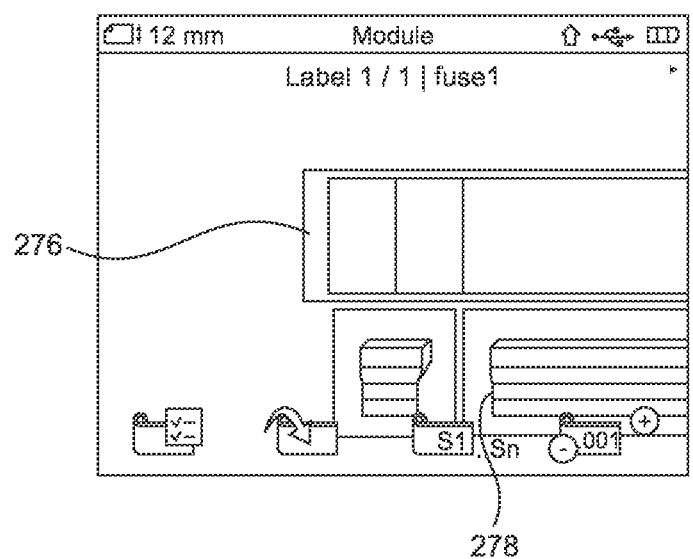

FIG. 9 shows a representation of a label 276 in relation to a fuse-box 278.

Figure 10:
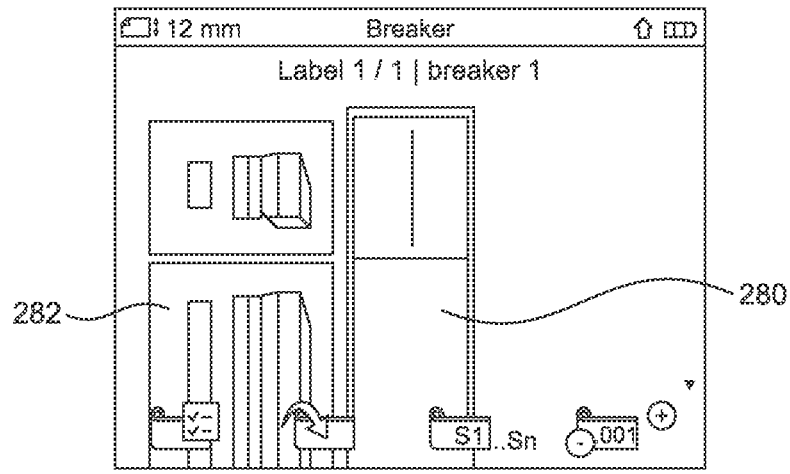

FIG. 10 shows a representation of a label 280 next to a representation of a breaker-box 282.

Figure 11:
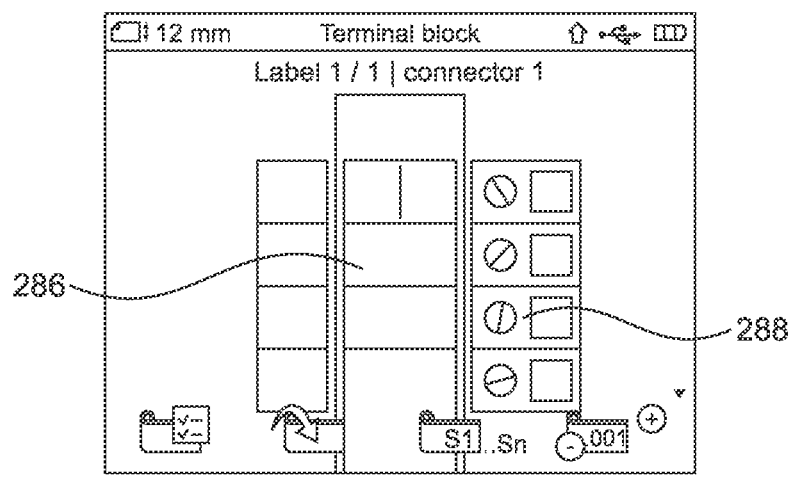

FIG. 11 shows a representation of a label 286 next to a representation of a terminal block 288.

Figure 12:
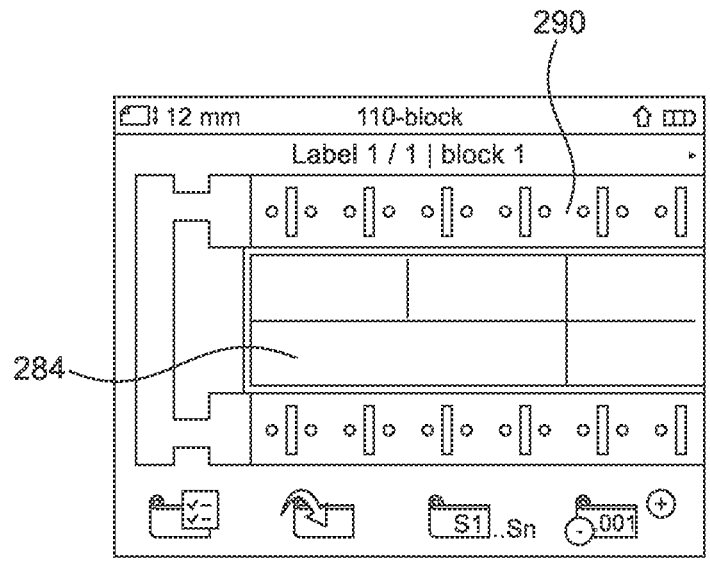

FIG. 12 shows a representation of a label 284 next to a representation of a 110-block 290.

Figure 13:
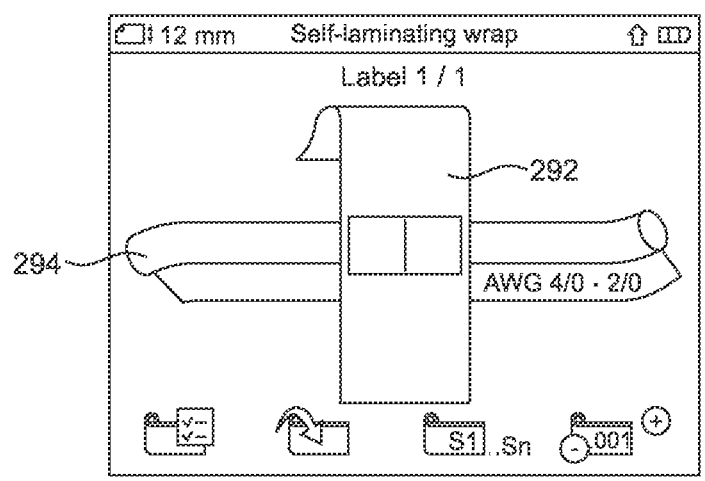

FIG. 13 shows a representation of a label 292 next to a representation of a cable 294.

The following table summarizes for each label type the associated properties associated with that label type and if the properties can be modified.

| Label application | Properties | Editable |
| --- | --- | --- |
| Quick label | Label orientation<br>Label outline<br>Leader/trailer match | Yes |
| General (fixed length) | Label orientation<br>Label length<br>Label outline<br>Leader/trailer match | Yes |
| Patch panel | Port numbers<br>#ports<br>#ports per group<br>Label setup<br>Dimensions<br>Center on center distance<br>Group clearance<br>Separator lines<br>Label outline | Yes |
| Breaker | Breaker numbers<br>Number of breakers<br>Breaker height<br>Number of poles (for each individual breaker) | Yes |

-continued

| Label application | Properties | Editable |
|---|---|---|
| Module | Separator lines<br>Label outline<br>Fuse numbers<br>Number of fuses<br>Fuse width<br>Fuse multiplier (for each individual module)<br>Separator lines<br>Label outline | Yes |
| Cable wrap | Wire/cable diameter | Yes |
| Self-laminating cable wrap | Wire/cable diameter<br>Label outline | No, except for label outline |
| Flag | Flag type<br>Flag length<br>Label outline | Yes |
| 110-block | Block type<br>Separator bar<br>Label outline | No, except for separator bar and label layout |
| Terminal block | Terminal numbers<br>Number of terminals<br>Terminal height<br>Separator bar between labels<br>Label outline | Yes |
| Distribution panel | Connector numbers<br>Number of connectors<br>Center to center distance<br>Separator bar<br>Label outline | Yes |
| Asset tracking | Label length<br>Orientation<br>Label outline | No, except for label outline |
| Heat-shrink tubing | Label length<br>Orientation<br>Label outline | Yes |

In some embodiments, the user can select to show or hide a label outline. The user can additionally or alternatively select how the label outline is represented and/or at what location.

The user can additionally or alternatively select if label separator lines or bars are to be shown and if so how.

In some embodiments, the property setting screens may contain one, two or more values which can be set/changed.

In all of these cases the user is provided with an accurate visual representation of their label next to the object to which the label is to be applied. In some embodiments any label edits will be displayed on the display 610 in real time. Therefore the user will be able to make adjustments as necessary to the label and will be able to see how the label looks relative to the object to which it is to be applied. This provides a user-friendly label-creating experience, and gives the user an accurate preview of how the label will look when it is applied to the selected object.

In some embodiments, thus label application visualization shows an image of the label application that is selected on the home screen. The image changes based on the properties set for the label application. The label application visualization may be a 1:1 mapping of the actual label application: the number of pixels used to represent the label application matches the size of the actual label application. In this way the on-screen label application representation is a good representation of the actual object that is being labelled.

For every label application a specific label application visualization may be supported. The display is thus dependent on a number of parameters which vary per label application and the selected label type/cassette.

While in the label edit screen, the visualization can be changed by changing values in the label property boxes. Making a change will have an immediate effect on the visualization.

Values may be changed by using one or more of: a slider bar to change a value, inputting a desired value, increment or decrementing a current value either in unit values or defined steps and using a value from a drop down menu.

The ways in which a user can navigate through the menus and user interfaces discussed above are various. For example, the user may operate keys on a hardware keyboard of the label printing apparatus to navigate around the display 610. Where the label printing apparatus is connected to an external apparatus such as a PC, the user may use other input means such as a mouse or tracker-pad. Alternatively, where the label printing apparatus has a touch-screen, the user may navigate through the display by directly touching the display.

The skilled person would appreciate that any of the methods described herein may be implemented using a computer program embodied on a computer readable medium (such as a CDROM or memory within a stand-alone printer) for controlling a controller (or other similar apparatus as discussed above).

Embodiments may be used with continuous tape or die cut labels. Die cut labels are provided on a continuous backing layer but are discrete, pre-cut labels. The tape or die cut labels may be provided in a cassette or simply on a roll.

The foregoing merely illustrates the principles of certain embodiments. Modifications and alterations to the described embodiments will be apparent to those skilled in the art in view of the teaching herein. It will thus be appreciated that those skilled in the art would be able to devise numerous techniques which although not explicitly described herein, embody the principles of the described embodiments and are thus within the scope defined by the claims.

We claim:

1. A method of creating a label to be printed by a label printing apparatus comprising:
    providing a user, on a display, with at least one option relating to a type of object, the type of object comprising an object to which the label to be printed is to be applied by the user after the label has been printed; and
    following selection of said at least one option displaying on said display an image representative of the label to be printed adjacent to or at least partially overlying a further image representative of the object to which the label to be printed is to be applied by the user after the label has been printed, so as to provide the user with an accurate visual representation of how the label will look relative to said object when printed and applied to the object.

2. A method as set forth in claim 1 comprising displaying said image of the label adjacent to said image of the object to which the label is to be applied.

3. A method as set forth in claim 1 wherein said type of object is selectable from a memory.

4. A method as set forth in claim 1 wherein said type of object comprises one of: a cable; a wire; a patch-panel; a terminal-block; a fuse-box; a 110-block; a module; a breaker block; and a distribution panel.

5. A method as set forth in claim 1 wherein said object is captured as a photograph.

6. A method as set forth in claim 1, wherein parameters of said object are adjustable.

7. A method as set forth in claim 1 wherein parameters of said label to be printed are adjustable.

8. A method as set forth in claim 6, wherein any adjustments to said parameters of said object cause an update of at least one of the image of said object and the image of said label.

9. A method as set forth in claim 7, wherein any adjustments to said label to be printed cause an update of at least one of the image of the label and the image of the object.

10. A method as set forth in claim 8, wherein updates of said images are displayed in real-time.

11. A method as set forth in claim 9, wherein updates of said images are displayed in real-time.

12. A method as set forth in claim 1, wherein said label printing apparatus is a stand-alone label printing apparatus.

13. A method as set forth in claim 1, wherein said label printing apparatus is connectable to an external apparatus.

14. A method of creating a label to be printed by a label printing apparatus comprising:
providing a user, on a display, with at least one option relating to a type of object, the type of object comprising an object to which the label to be printed is to be applied by the user after the label has been printed;
enabling the user to select said at least one option;
and following selection of said at least one option enabling said user to set parameters of said label to be printed and to set parameters of said object; and
displaying on said display an image representative of the label to be printed adjacent to or at least partially overlying a further image representative of the object to which the label is to be applied by the user after the label has been printed, so as to provide the user with an accurate visual representation of how the label will look relative to said object when printed and applied to the object.

15. An apparatus comprising:
means for providing a user, on a display, with at least one option relating to a type of object, the type of object comprising an object to which a label to be printed is to be applied by the user after the label has been printed; and
means for displaying on said display, following selection of said at least one option, an image representative of the label to be printed adjacent to or at least partially overlying a further image representative of the object to which the label to be printed is to be applied by the user after the label has been printed, so as to provide the user with an accurate visual representation of how the label will look relative to said object when printed and applied to the object.

16. An apparatus comprising:

at least one processor;

and at least one memory;

the at least one processor and the at least one memory arranged to cause the apparatus at least to provide a user, on a display, with at least one option relating to a type of object, the type of object comprising an object to which a label to be printed is to be applied by the user after the label has been printed; and arranged to display, following selection of said at least one option, an image representative of the label to be printed adjacent to or at least partially overlying a further image representative of the object to which the label to be printed is to be applied by the user after the label has been printed, so as to provide the user with an accurate visual representation of how the label will look relative to said object when printed and applied to the object.

17. A computer program comprising computer program code means stored on a non-transitory computer readable medium adapted to perform, when said program is run, a method comprising providing a user, on a display, with at least one option relating to a type of object, the type of object comprising an object to which a label to be printed is to be applied by the user after the label has been printed; and following selection of said at least one option causing to be displayed on the display an image of the label to be printed adjacent to or at least partially overlying a further image representative of the object to which the label to be printed is to be applied by the user after the label has been printed, so as to provide the user with an accurate visual representation of how the label will look relative to said object when printed and applied to the object.

* * * * *